United States Patent
Vetro et al.

(10) Patent No.: US 6,542,545 B1
(45) Date of Patent: Apr. 1, 2003

(54) ESTIMATING RATE-DISTORTION CHARACTERISTICS OF BINARY SHAPE DATA

(75) Inventors: Anthony Vetro, Staten Island, NY (US); Huifang Sun, Cranbury, NJ (US); Yao Wang, Matawan, NJ (US); Onur G. Guleyruz, White Plains, NY (US)

(73) Assignee: Mitsubishi Electric Reseach Laboratories, Inc., Canbridge, MA (US)

( * ) Notice: Subject to any disclaimer, the term of this patent is extended or adjusted under 35 U.S.C. 154(b) by 0 days.

(21) Appl. No.: 09/410,552

(22) Filed: Oct. 1, 1999

(51) Int. Cl.[7] .............................................. H04N 11/02
(52) U.S. Cl. ................................................ 375/240.08
(58) Field of Search ........................... 375/240, 240.03, 375/240.08, 240.1

(56) References Cited

U.S. PATENT DOCUMENTS 5,790,196 A * 8/1998 Sun et al. ................... 348/419
6,154,570 A * 11/2000 Boon .......................... 382/236

OTHER PUBLICATIONS

Descombes et al.; Estimation of Markov Random Field Prior Parameters Using Markov Chain Monte Carlo Maximum Likelihood; Institut National De Recherche En Informatique Et En Automatique; No. 3015; Oct. 1996.*

Descombes et al.; "Estimation of Markov Random Field Prior Parameters Using Markov Chain Monte Carlo Maximum Likelihood"; Institut National de Recherche en Informatique et en Automatique, No. 3015; Oct. 1996.

Katsaggellos et al.; MPEG–4 and Rate–Distortion–Based Shape–Coding Techniques; Proceedings of the IEEE, vol. 86, No. 6. Jun., 1998; pp. 1126–1154.

Schuster et al.; "An Optimal Polygonal Boundary Encoding Scheme in the Rate Distortion Sense"; IEEE Trancactions of Image Processing, vol. 7, No. 1. Jan. 1998; pp. 13–26.

* cited by examiner

Primary Examiner—Chris Kelley
Assistant Examiner—George A Bugg
(74) Attorney, Agent, or Firm—Dirk Brinkman

(57) ABSTRACT

A method estimates rate and distortion characteristics of a video object. First and second object shape features are respectively extracted at a first and second resolution of the video object. First and second rate distortion characteristics of the video object are respectively determined from the extracted first and second object shape features according to first and second modeling parameters. The extracted object shape features can be discrete, such as states of binary shape patterns of the video object, or the object shape features can be continuous such as a set of statistical moments representing a probability density function of the video object.

28 Claims, 9 Drawing Sheets

ESTIMATING RATE-DISTORTION CHARACTERISTICS OF BINARY SHAPE DATA

FIELD OF THE INVENTION

This invention relates generally to estimating rate-distortion, and more particularly, to the estimating the rate-distortion characteristics of binary shape data in a video sequence.

BACKGROUND OF THE INVENTION

Recently, a number of standards have been developed for communicating visual information. For digital images, the best known standard is JPEG, see Pennebacker et al., "JPEG Still Image Compression Standard," Van Nostrand Reinhold, 1993. For video sequences, the most widely used standards include MPEG- 1 (for storage and retrieval of moving pictures), MPEG-2 (for digital television) and H.263, see ISO/IEC JTC1 CD 11172, MPEG, "Information Technology—Coding of Moving Pictures and Associated Audio for Digital Storage Media up to about 1.5 Mbit/s—Part 2: Coding of Moving Pictures Information," 1991, LeGall, "MPEG: A Video Compression Standard for Multimedia Applications," Communications of the ACM, Vol. 34, No. 4, pp. 46–58, 1991, ISO/IEC DIS 13818-2, MPEG-2, "Information Technology—Generic Coding of Moving Pictures and Associated Audio Information—Part 2: Video," 1994, ITU-T SG XV, DRAFT H.263, "Video Coding for Low Bitrate Communication," 1996, ITU-T SG XVI, DRAFT13 H.263+Q15-A-60 rev.0, "Video Coding for Low Bitrate Communication," 1997.

These standards are relatively low-level specifications that primarily deal with spatial compression in the case of images, and spatial and temporal compression for video sequences. As a common feature, these standards perform compression on a per frame basis. With these standards, one can achieve high compression ratios for a wide range of applications.

Newer video coding standards, such as MPEG-4 (for multimedia applications), see "Information Technology—Generic coding of audio/visual objects," ISO/IEC FDIS 14496-2 (MPEG4 Visual), Nov. 1998, allow arbitrary-shaped objects to be encoded and decoded as separate video object planes (VOP). The objects can be visual, audio, natural, synthetic, primitive, compound or combinations thereof.

This emerging standard is intended to enable multimedia applications, such as interactive video, where natural and synthetic materials are integrated, and where access is universal. For example, one might want to "cut-and-paste" a moving figure or object from one video to another. In this type of application, it is assumed that the objects in the multimedia content have been identified through some type of segmentation process, see for example, U.S. patent application Ser. No. 09/326,750 "Method for Ordering Image Spaces to Search for Object Surfaces" filed on Jun. 4, 1999 by Lin et al.

The emergence of the MPEG-4 standard has provoked a great deal of interest in object-based encoding methodologies. One of the key requirements for object-based encoding is an efficient and flexible means for coding the shape of objects. The MPEG standard has adopted a context-based arithmetic encoding (CAE) process for this purpose. For compatibility with texture coding, this process has been modified to operate at the macroblock level. A macroblock is a 16×16 group of pixels in an image or frame.

For the coding of texture, a variety of models exist. These models provide a relation between the rate and distortion that can be achieved, see for example, Chiang et al. "A new rate control scheme using quadratic rate distortion modeling," IEEE Trans. Circuits and Systems for Video Technology, February 1997, and Hang et al. "Source model for transform video coder and its application—Part I: Fundamental theory," IEEE Trans. Circuits and Systems for Video Technology, April 1997.

These models are most useful for rate control and have been successfully been applied to frame-based video coding. Given some bit budget for a frame, one can find a quantizer value that meets a specified constraint on the rate. Additionally, such models can be used to analyze the source or sources to be encoded in an effort to optimize coding in a computationally efficient way. In the case of shape coding, however, no such models exist.

The relationship between the rate and distortion is very different. The reason for this difference is due to the techniques used to code each type of data. In the MPEG standards, texture is coded by first partitioning the data into disjoint macroblocks. The data in these macroblocks are decorrelated using the well-known Discrete Cosine Transform (DCT), which has the property of mapping the signal energy into a small number of coefficients. From this frequency domain, loss may be introduced by quantizing the DCT coefficients. In this process, some high frequency coefficients may become zero. At this point, the 2D macroblock of quantized DCT coefficients are organized into a 1D vector using a zigzag scanning pattern. The run-lengths of these coefficients are then entropy coded using a Huffman look-up table. In this way, long zero run- lengths can be efficiently encoded. Signal variance and the quantizer value play a major role in the final energy of the DCT coefficients. Consequently, variance-like measures have been widely used as the observed data or input for rate-distortion (R-D) or rate-quantizer models.

In the MPEG-4 standard, the shape data are also partitioned into disjoint macroblocks. As with texture, the macroblocks can be encoded using several modes. For simplicity, the intra mode is only described. In this mode, three different types of blocks are considered: transparent, opaque, and border blocks. Transparent and opaque blocks are signaled as a macroblock type. For the border blocks, a template of 10 pixels is used to define the casual context for predicting the shape value of a current pixel. FIG. 1 shows an intra-context template of ten pixels (c0, . . . , c9) 100, and a current pixel x 101. Note, the specific arrangement of the ten neighborhood pixels in rows of three, five, and two pixels, and the location of the current pixel with respect to the template.

A context C for the current pixel is determined according to:

$$C = \sum_k c_k \cdot 2^k$$

Typically, the context C ranges from 0 to 1023. The context is used to index a probability table to obtain a sequence of probabilities that are used to drive an arithmetic encoder.

When shape macroblocks are coded at full-resolution (16×16 pixels), this algorithm is able to achieve a lossless representation. To reduce the bit-rate, distortion can be introduced through successive down-sampling of the original macroblock by a factor of two, four, more. In this case, the subsampling factor is transmitted along with the subsampled data, and at the decoder end, the data are upsampled back to the full-resolution.

There are two major differences between the texture and shape coding. The first difference is the entropy coding process. Texture coding uses a Huffman table to assign variable length codes to quantized DCT coefficient run-lengths, while shape coding computes a context for every pixel and associates a probability that the pixel is either zero or one. The second difference is in the way that distortion is introduced. Texture coding quantizes the DCT-domain coefficients, while shape coding down-samples the data.

Because of these differences, new methods are required to estimate the rate-distortion characteristics of object shape.

SUMMARY OF THE INVENTION

The invention provides a method that estimates rate and distortion characteristics of a video object. First and second object shape features are respectively extracted at a first and second resolution of the video object. First and second rate distortion characteristics of the video object are respectively determined from the extracted first and second object shape features according to first and second modeling parameters. The extracted object shape features can be discrete, such as states of binary shape patterns of the video object, or the object shape features can be continuous such as a set of statistical moments representing a probability density function of the video object.

In one aspect of the invention the video object is segmented into macroblocks, and the extracting and determining steps are performed for each of the macroblocks, and the second resolution can be a downsampling of the first resolution. Alternatively, the second object shape features can be predicted from the first object shape features without performing the downsampling. Typically, the modeling parameters are acquired from a set of training video objects. The invention enables object based video encoders and transcoders, and optimal video object segmentation.

BRIEF DESCRIPTION OF THE DRAWINGS

FIGS. 4a–e are block diagrams of binary shape configurations and scoring schemes;

DETAILED DESCRIPTION OF PREFERRED EMBODIMENTS

Introduction

Figure 1:
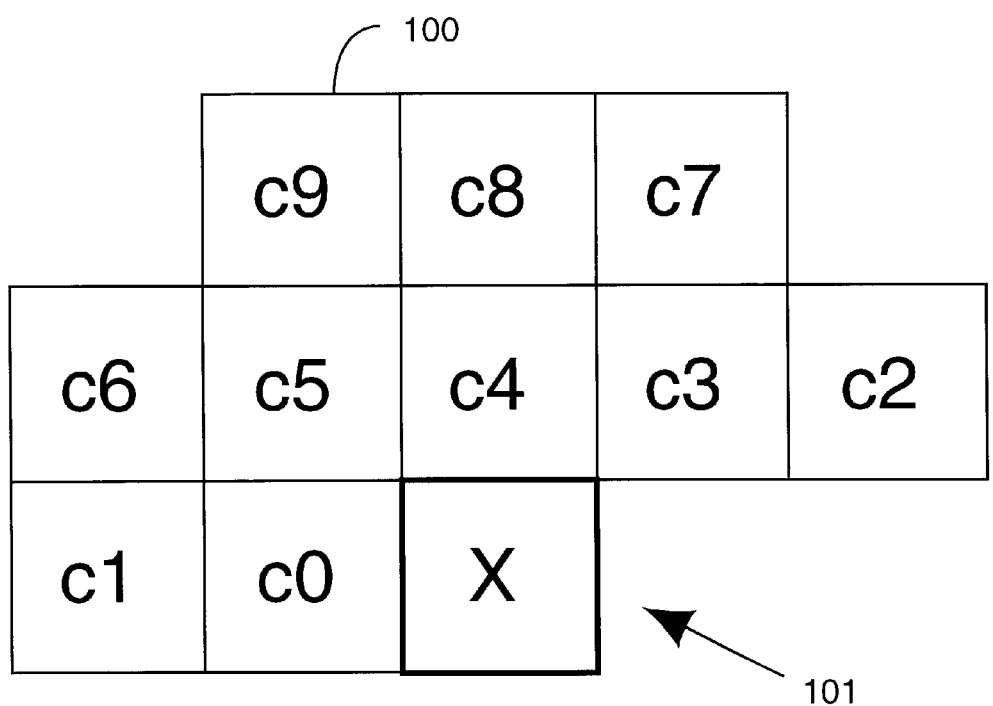
FIG. 1 is a block diagram of an intra context of ten pixels and a current pixel.

We describe methods which accurately estimate rate-distortion (R-D) characteristics of binary shape data according to our invention. In describing specific methods, we focus on the CAE methods adopted by the MPEG-4 standard for encoding the shape of objects. In CAE encoding, each macroblock is treated as a binary string of zeroes and ones having some probability distribution conditioned upon pixel values in a local neighborhood. This coding algorithm can be classified as a statistical coding algorithm taking advantage of the high degree of local correlation that exists in images. In fact, any coding algorithm that is context-based can be considered statistical. The reason is that some degree of training is conducted on a set of training samples to determine the best probabilities for look-up-table used during the coding process.

This type of coding process differs significantly from geometrical coding processes that describe the boundary of the object as, for example, a polygon approximation or as a sequence of lines that are characterized by their respective angular directions. Geometric coding processes are well known in the prior art.

As a general note, statistical coding schemes, which rely on local properties of the data, should be modeled with parameters that can account for local variation in the data. A great deal of research on feature extraction has been conducted within the computer vision and graphics community. Such work includes Fourier descriptors and other geometrical parameters that account for angular variation of arcs, etc.

The problem with applying geometric parameters to our shape modeling problem is twofold. First, the geometric parameters are generally global, and, therefore, geometric parameters cannot be applied to block-based coding schemes, such as MPEG-4. Second, even if the parameters could be applied locally, it is very difficult to associate geometric properties to information-theoretic concepts, such as rate and distortion.

Consequently, we describe methods of shape modeling that extract meaningful R-D parameters from local characteristics of the image.

It should be emphasized that down-sampling and up-sampling operations are key processes that need to be considered in the R-D analysis of MPEG4 shape information. In addition to the computation of the context for rate, these processes have significant influence over the rate and distortion that are produced. Down-sampling by a factor of two is typically achieved by summing a subblock of four pixels. The down-sampled pixel is zero when the sum is less than two, and otherwise, the down-sampled pixel is one.

However, the up-sampling operation is a bit more involved. Without going into too many details, an 8-bit adaptive context is computed from surrounding pixels in the down-sampled image. This context, with a maximum value of 256, is used to access a threshold value. If the weighted sum of subblock pixels is above this threshold, then the up-sampled pixel is a one, otherwise it is zero. It should be noted that four up-sampled pixels are computed for each twelve pixel neighborhood, and the weighted sum changes for each of the four pixels.

As an extension to our modeling, we describe several applications which can benefit from our a modeling. These applications are not dependent on the form of the compressed shape, but rely on the fact that there exists such a model to estimate the R-D characteristics. These characteristics are however dependent on the coding process.

The first application is in an analysis stage of an object-based encoder. Similar to the texture coding, such an encoder be used to meet constraints on the bit-rate and distortion, and the model also provides necessary data for an optimization procedure. More importantly, for low bit-rate applications, the shape coding can consume a significant percentage of the total bit-rate, see Vetro, et. al., "MPEG-4 rate control for multiple video objects," IEEE Trans. Circuits and Systems for Video Technology, February 1999. Therefore, it becomes crucial to know the R-D characteristics of the various shapes that are being considered at the time of encoding so that buffer constraints are met and the bit allocation among several objects is appropriate. Furthermore, our model for the shape allows one to consider a joint optimization between the shape and texture coding.

The second application is in transcoding of object-based bitstreams. In this case, a scene composed of multiple arbitrarily shaped objects has already been encoded, where each scene is its own independent bitstream. However, due to bandwidth limitations, the rate at which the original objects were encoded is too high and must be scaled. To scale the bits used for texture, appropriate texture models are used. Similarly, appropriate shape models are used to scale the amount of bits used for shape.

The final application creates an R-D optimal segmentation, with respect to the MPEG-4 coding process. Two distinct possibilities are noted. One in which the segmentation is given and we wish to use the shape model to adapt the boundary so that the segmentation is R-D optimal, and another in which the shape model is used in conjunction with a segmentation algorithm to yield an R-D optimal segmentation. In both cases, the R-D characteristics of the shape is improved, which means that fewer bits and/or less distortion can be achieved. It is important though that the integrity of the original segmentation be maintained.

Shape Modeling Framework

Figure 2:
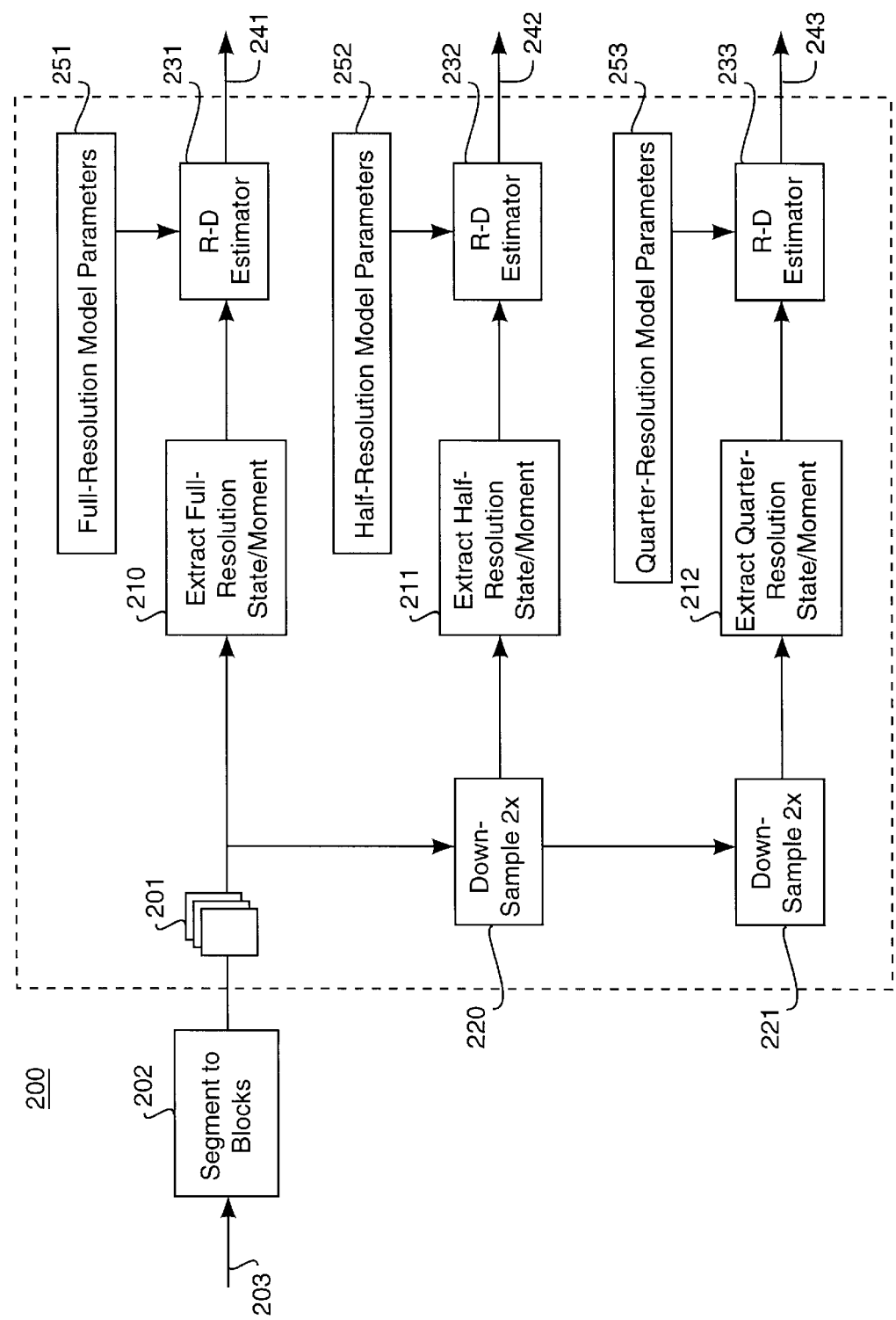
FIG. 2 is a flow diagram of a method for determining rate and distortion characteristics without prediction.
Figure 3:
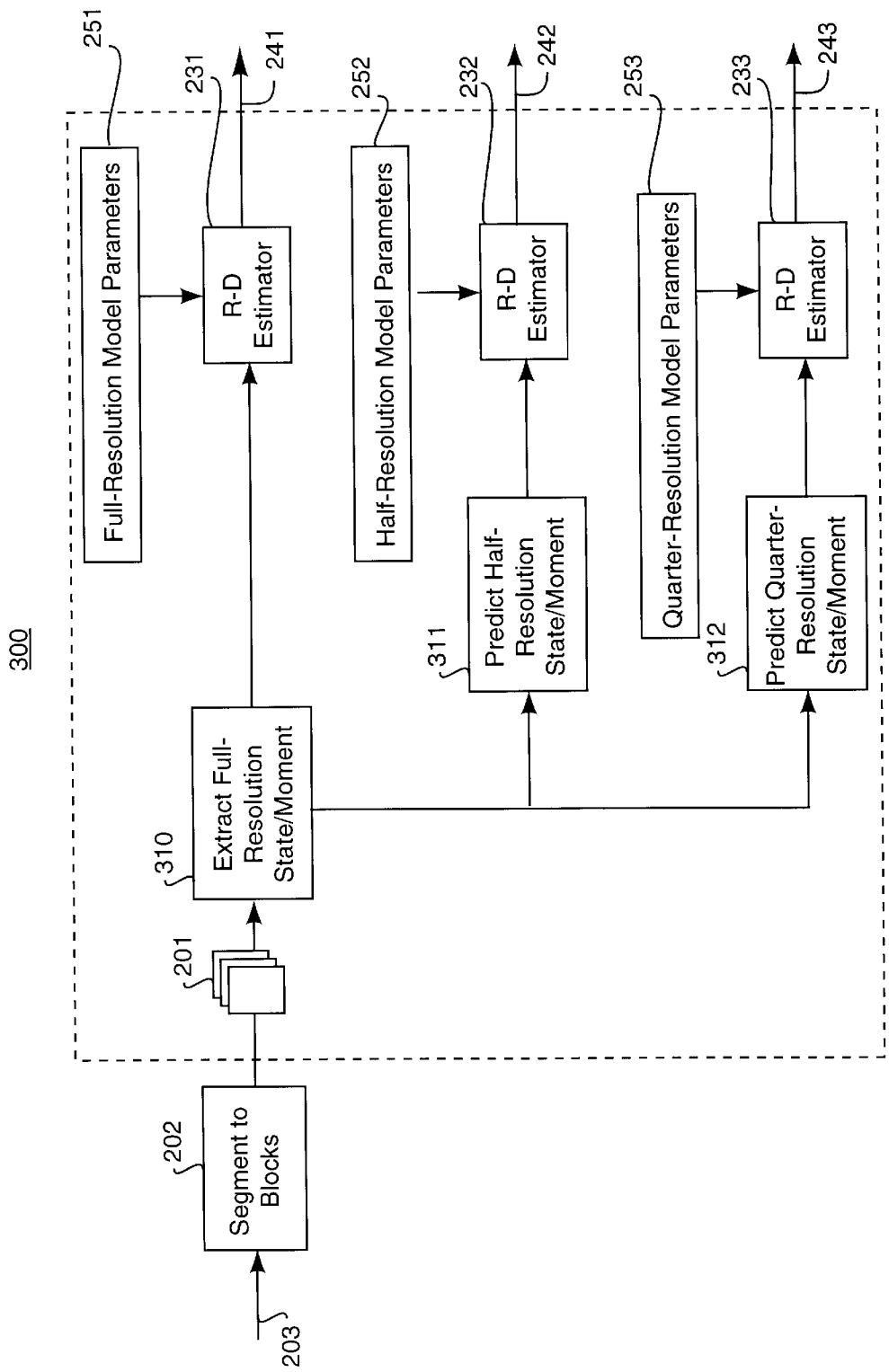
FIG. 3 is a flow diagram of a method for determining rate and distortion characteristics with prediction.

As shown in FIGS. 2 and 3, we describe two alternative methods 200 and 300 for which our shape modeling processes can be applied. The first method 200 is based on a non-predictive scheme, which extracts 210–212 shape features (a set of discrete states or a set of moments of a continuous function) for every resolution that is considered, e.g., full-, half- and quarter-resolution. In this method, down-sampling 220–221 is performed on image or frame macroblocks 201.

The second method 300 is based on a predictive scheme. Here, the features (state or moments) are extracted 310 only at the full-resolution. The features at lower resolutions are predicted 311–312. In both methods, the shape features can be expressed as a set of discrete states or a set of statistical moments of a continuous function. Each set is described in more detail below. We should note that the predictive method 300 scheme is more efficient computationally because it does not down-sample every macroblock.

In each method, we must first segment 202 given shape data 203 into macroblocks 201. The shape data can be in the form of a video object. This step ensures that rate-distortion estimates are made at the macroblock level. In block-based coding schemes such as MPEG-4, decisions on how to code the shape are made at the macroblock level. These decisions include the mode in which the macroblock will be coded and the conversion ratio that will be used. Of course, in the most extreme case which is not MPEG-4 based, our segment can be defined as the entire frame of shape data of the entire video object. In other words, the macroblock is the entire frame.

In the non-predictive method, the shape features (states or moments) are extracted for every resolution, e.g., 1, ½, and ¼, and each set of features. is input to an R-D estimator 231–233 to achieve an accurate estimate of the rate and distortion characteristics 241–243 of the block-based shape data for every resolution.

In order to produce this output, the R-D estimators 231–233 also needs a predetermined set of model parameters 251–253, which, in general, vary for each resolution. The model parameters 251–253 can be learned during a training phase described below.

In the predictive method 300, the major difference is that the down-sampling operations 220–221 are not executed. Rather, the sets of states or moments are extracted at the full-resolution only, then the features (states or moments) for the lower resolutions are predicted 311–312. The R-D estimators 231–233 operates in the same manner as in other method. Although, we describe and show three levels of resolution, it should be noted that the R-D characteristics can also be determined with two levels of resolution. Obviously, more resolutions allow greater precision on estimating the rate distortion characteristics, and a denser compression.

Shape Modeling Using State Partitioning

In this modeling approach, we extract a set of shape parameters or features for each macroblock. These parameters are easy to determine and are used to estimate the corresponding rate and distortion characteristics of the macroblocks at multiple resolutions.

As shown in FIGS. 4a–e, our modeling approach is based on partitioning all possible binary configurations of pixels over a M×M subblock 400 into N discrete states. In general if a subblocks has M×M pixels, then the number of binary patterns is $2^{(M \times M)}$, and the number of states is N, where N is substantially less than $2^{(M \times M)}$.

FIG. 2a shows sixteen binary patterns partitioned into four possible states, and FIG. 2b alternatively shows six states. FIG. 2c shows a scoring scheme that leads to the four states of FIG. 2a, and FIG. 2d shows a scoring scheme that leads to the six states of FIG. 2b. FIG. 2e indicates the neighborhood pixels by "x" and the current pixel by "o" the purpose of scoring the 2×2 subblock.

According to our invention, a parameter $q_{ij}$ represents a state i at a resolution j, where 0 is full-scale, 1 is half-scale, and 2 is quarter-scale. A parameter $n_i$ represents the number of occurrences of state $q_{ij}$. Then, for every macroblock, the rate R and distortion D are determined by:

$$R_j = \underline{\alpha}_j^T \underline{n} = \sum_{i=0}^{N-1} \alpha_{ij} n_{ij} \qquad D_j = \underline{\beta}_j^T \underline{n} = \sum_{i=0}^{N-1} \beta_{ij} n_{ij}$$

where the α's and β's are the model parameters 251–253 that need to be estimated.

Here, the parameter $\alpha_{ij}$ denotes the rate for coding a pattern which belongs to state $q_{ij}$, and the parameter, $\beta_{ij}$ denotes the distortion that is associated with such a pattern at scale j. When the shape is coded without loss at full-scale, $\underline{\beta}=\underline{0}$. Lastly, in modeling the rate that is generated by an arithmetic encoder we have, $$\alpha_{ij} = -\log_2(p_{ij})$$

where $p_{ij}$ is the probability of state $q_{ij}$.

Assuming that the subblock of pixels is fixed, a first step of our method partitions all possible binary configurations into states, as described above. We partition so that patterns belonging to the same state meet the following criteria.

First, the patterns have similar probability so that reliable estimates of the rate are obtained. Second, the patterns incur similar distortion when down-sampled.

Figures 4A, 4B, 4C, 4D, 4E:
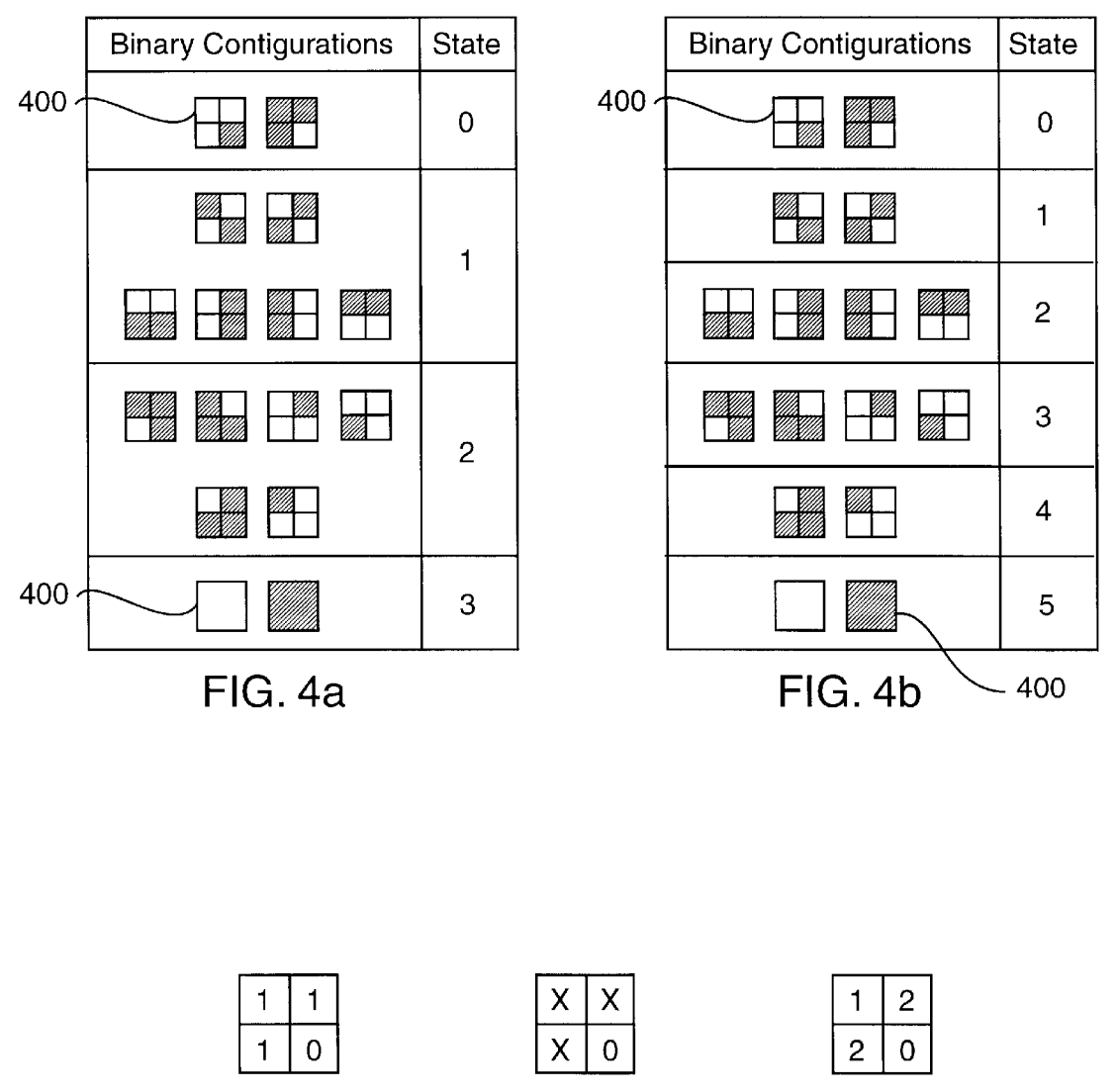

FIG. 4a illustrates the possibility that considers the subblock pixels that are equal to the value of the current pixel. This partitioning leads to four possible states. This type of partitioning assumes that the current pixel is equally influenced by the horizontally, vertically, and diagonally adjacent pixels. However, in reality, the diagonally adjacent pixel should have less influence.

Therefore, as shown in FIG. 4b, an alternative partitioning considers the expected influence of each pixel. In this way, it becomes possible to regulate the type of subblock configurations that falls into a higher or lower state. Consequently, the portioning of FIG. 4b leads to six states. More importantly, the six states overcome the diagonal drawback of the four state scheme.

During the training phase, we maintain a counter $c_i$ for each state i, along with a cumulative sum of the rate $r_i$ that is incurred by each state. Therefore, the $$\bar{r}_i = r_i/c_i$$

average rate for a particular state i is:

Because the rate is determined solely by the context that is determined by the CAE algorithm, training at one resolution is valid for all resolutions.

For distortion, however, this is not the case. There, we train at each resolution. For each resolution, the number of state occurrences and distortion for each state is accumulated in a similar way to the rate. The distortion is obtained by carrying out the up-sampling and measuring the associated distortion. The major difference with training the distortion, in comparison to the rate, is that the distortion is dependent on a number of neighboring pixels and as a result is more difficult to model than the rate.

In terms of computation, this method of modeling provides significant advantages over calculating the rate and distortion by brute force methods. Instead of using the 10-bit context for every pixel, as shown in FIG. 1, we perform a four pixel calculation. To obtain the rate and distortion with our model, we still down-sample. However, because we obtain our estimates of the distortion from the reduced resolution blocks, we do not need to perform the up-sampling procedure. This is a significant gain because we only consider a small number of resolutions. Also, the binary computation that compares the up-sampled block with the original is avoided.

To summarize, the observed data, e.g., a video object are partitioned into discrete states, and each state has a set of model parameters associated with it. The states are based on a subblocks of pixel patterns, and the model parameters are obtained by fitting the parameters to a set of training images.

One way to improve on this method is to consider a larger subblock, such as a 3×3 subblock. Similar scoring schemes can be specified that consider all possible patterns, taking into account symmetries and rotations. A new set of states can be trained in a similar manner, as described above.

Shape Modeling Using Statistical Moments

In contrast to the previous modeling approach, this method relies on statistical moments of the data extracted. As a general definition, moments represent functions of particular patterns that summarize the statistics of the pattern. The simplest examples of moments are the mean and variance of some given data. In the case of Gaussian random variables, these moments completely describe continuous probability density functions (PDF). Higher order moments may also be derived. One may argue that texture data can be sufficiently modeled by such Gaussian distributions, or even a Laplacian distribution. As a result, the variance can serve as a suitable model parameter for the texture.

In the context of our shape modeling problem, patterns correspond to the given shape data, mappings of the given shape data into another space, or samples that are generated from a probabilistic model.

For shape, we prefer a distribution whose samples resemble the type of data that we are trying to code, just as a Laplacian distribution is representative of texture samples. Our model also makes distinctions between the data at various scales. To do so, we consider Markov models, which have been extensively used in image processing applications, such as image restoration and segmentation. Because of Markov models can model global properties with local constraints, Markov Random Fields (MRF's) are very popular.

A Gibbs Random Field (GRF) provides a global model for an image specifying $$P_\Theta(X) = \frac{1}{Z(\Theta)} \exp\left[-\sum_i \theta_i N_i(X)\right]$$

a probability mass function of the form:

where $N_i(X)$ are functions of the configuration X and the Gibbs field, $P_\Theta(X)$, is parameterized by the vector, $\Theta=(\theta_i)$. There are many ways to express the exponential term, also referred to as the energy function. Here, the energy is expressed linearly with respect to its parameters $\theta_i$.

An MRF is a probabilitic model, such as the one defined above, which is defined by local conditional probabilities. The MRF must satisfy the following properties:

1. Positivity: P(X)>0, for all X.
2. Markovianity: P(X(i)|all lattice sites except i)=P(X(i)|neighbors of i).
3. Homogenity: P(X (i)|neighbors of i) depends only on the pattern of its neighbors and is translation-invariant.

Given the above properties, the Hammersly-Clifford theorum allows one to establish an equivalence between an MRF and a GRF.

Most of the MRF literature deals with methods of parameter estimation and methods for using these parameters for image restoration.

In contrast, we describe how statistical moments $N_i(X)$ can be used for shape modeling. We extract these parameters from the given shape data, e.g., segmented macroblocks. These parameters yield a good summary of the data provided that the underlying probabilistic model is characteristic of the shape data. More details of the models discussed herein are described by Descombes et al., in "Estimation of Markov Random Field prior parameters using Markov Chain Mote Carlo Maximum Likelihood," IEEE Trans. Image Processing, July 1999.

A simple model that fits the above form, also referred to as the Potts model, is given by:

$$P_\beta(X) = \frac{1}{Z(\beta)} \exp[-\beta N_0(X)]$$

Here, the probabilistic model depends on the single parameter, $\beta$, instead of the vector $\Theta$.

The statistical moment, $N_0(X)$, is extracted from X and is given by $$N_0(X) = \sum_{c=[s,\bar{s}]\in C} \partial_{x_s \neq x_{\bar{s}}},$$

where C is a set of "cliques" that includes two neighboring pixels. The value $\partial$ is one when true, and zero when false. This moment essentially measure the number of inhomogeneous cliques in the configuration X. Of course, this simple model with one parameter can be expaned into additional parameters that account for horizontal, vertical and diagonal interactions.

The problem that is encountered with the Potts model is that higher order interaction are not taken into account, and as a result, it is very difficult to accurately define the local characteristics of the data. If we consider cliques of more than two pixels, then the possibilities of extracting useful parameters is increased.

Figure 4F:
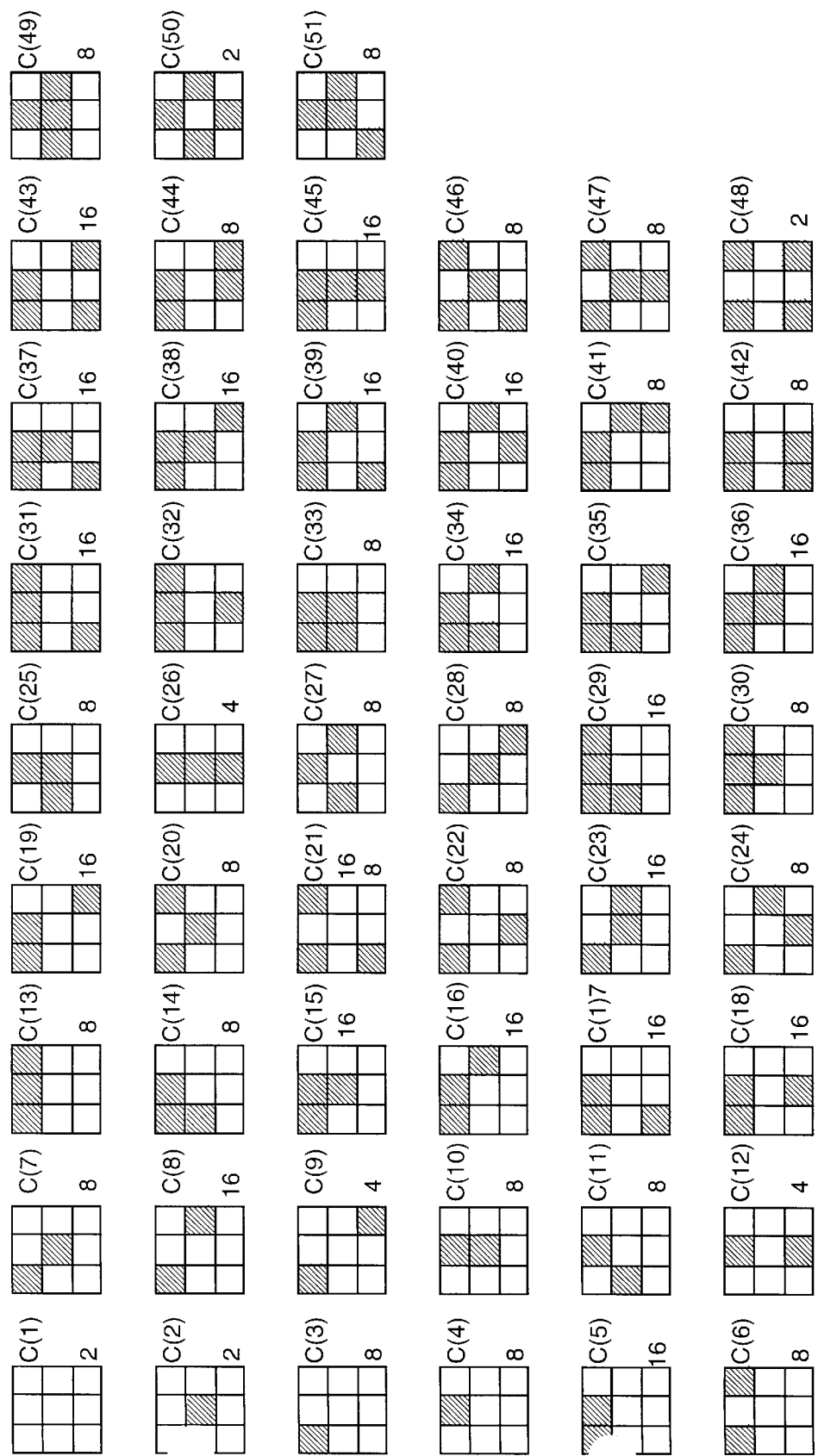
FIG. 4f is a diagram of classes induced by a 3×3 model of pixels and their elements.

As a second example, we consider the Chien model, see FIG. 4f. In this model, 3×3 cliques (or partitoned subblocks) of pixels are used, and the model relies on three parameters: edge, line and noise, denoted e, l and n, respectively, and each parameter denoting an elementary cost or energy. The edge factor of a clique pattern represents clumps of pixels, see C(33), a line is possible in C(26) or C(28), and C(21) is more reflective of noise.

By considering all possible patterns over the 3×3 block and taking into account symmetric and rotational considerations, it turns out that 51 distinct 3×3 configurations exist as shown in FIG. 4f. Each of the 51 configurations is associated with a potential, C(i), which is a linear combination of the three parameters:

$$C(i) = \epsilon(i)e + \lambda(i)l + \eta(i)n$$

The distribution of the Chien model is a Gibbs field of the form $$P_{e,l,n}(X) = \frac{1}{Z(e,l,n)} \exp[-e N_0(X) - l N_1(X) - n N_2(X)]$$

where, $$N_0(X) = \sum_{i=1,\ldots,51} \epsilon(i)\zeta_i(X)$$

$$N_1(X) = \sum_{i=1,\ldots,51} \lambda(i)\zeta_i(X)$$

$$N_2(X) = \sum_{i=1,\ldots,51} \eta(i)\zeta_i(X)$$

and $\zeta_i(X)$ is the number of configurations of type i in the realization of X. With this model, the statistical moments intuitively represent the distinction between shapes and sub-regions of the shapes that are very representative of the three parameters of interest. This is very valuable for the modeling of shape.

To summarize, various statistical moments can be extracted from the given data. The moments that are considered above are based on MRF models. These models are capable of producing realization that closely resemble the class of shape data that we are interested in modeling. As with the set of states, these measures can be incorporated into a linear model with similar model parameters. As with any measure that is extracted from the data, we rely on the accuracy of the measure to provide distinguishable information pertaining to the rate-distortion characteristics.

Applications

Object-Based Encoder

Figure 5:
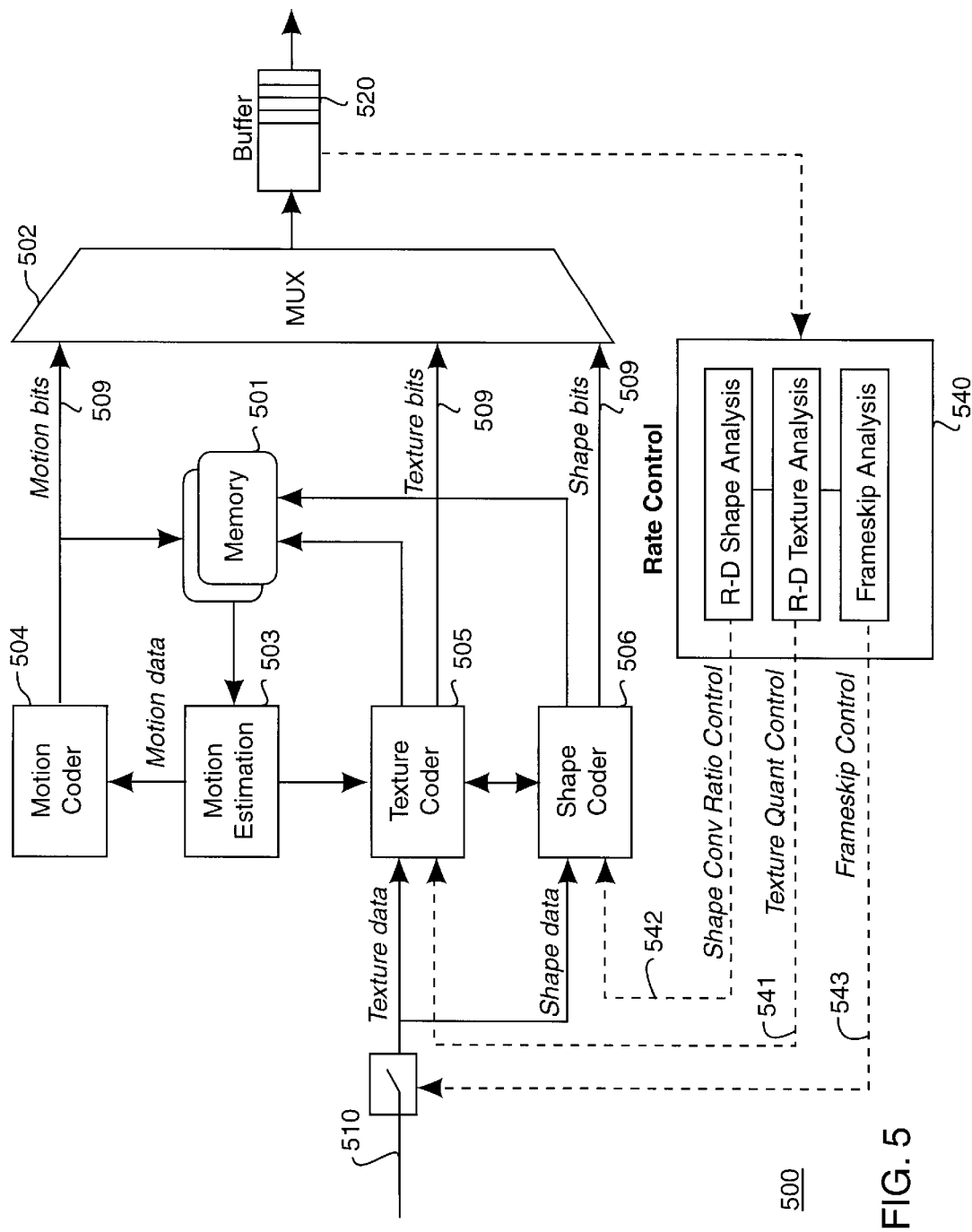
FIG. 5 is a block diagram of a video encoder using rate-distortion characteristics according to the invention.

FIG. 5 shows an object-based video encoder 500 that uses our invention. This type of encoder can encode according to the MPEG-4 standard. The encoder includes a memory 501, a mux 502, a motion estimator 503, a motion coder 504, a texture coder 505, a shape coder 506, a rate control block 540, and an output buffer 520.

Methods for coding texture and motion are quite well known. The new element enabled by the present invention is the shape coder 506. The general problem can be stated as follows. Given input scene data 510 that are composed of multiple objects and a single output buffer that multiplexes all information from all objects, control the total number of bits 509 produced by the coding process so that overflow of the buffer is avoided.

In part, we use a multiple object rate control method as described in U.S. Pat. No. 5,790,196, "Adaptive Video Coding Method," issued to Sun et al., incorporated herein by reference. There, the rate control algorithm is capable of performing analysis on the texture data only. This may be suitable for coding video objects with no significant shape overhead, but for low bit-rates, the shape overhead increases and the ability to estimate the rate-distortion characteristics is vital to guarantee buffer stability.

The input 510 to the encoder 500 includes segmented video objects. The texture data are sent to the texture coder 505, and the shape data are sent to the shape coder 506. The rate control block 540 is responsible for maintaining the buffer occupancy level and the quality of the encoded objects.

Therefore, the rate control block 540 has feedback from the buffer 520 and the necessary texture and shape data. Three control signals are sent out from the rate control. The first two, a quantizer value 541 for texture blocks and a conversion ratio 542 for shape blocks, are used to control the quality of the texture and shape respectively, given the constraints on the rate and current buffer levels. If the constraints cannot be met, then a frameskip control signal 543 will reduce the rate at which objects are encoded. By estimating the rate from texture and shape models, the rate control block can determine whether frames should be skipped.

This encoder 500 illustrates how the shape modeling described above can be used in the analysis stage of an object-based encoder.

Object-Based Transcoder

Figure 6:
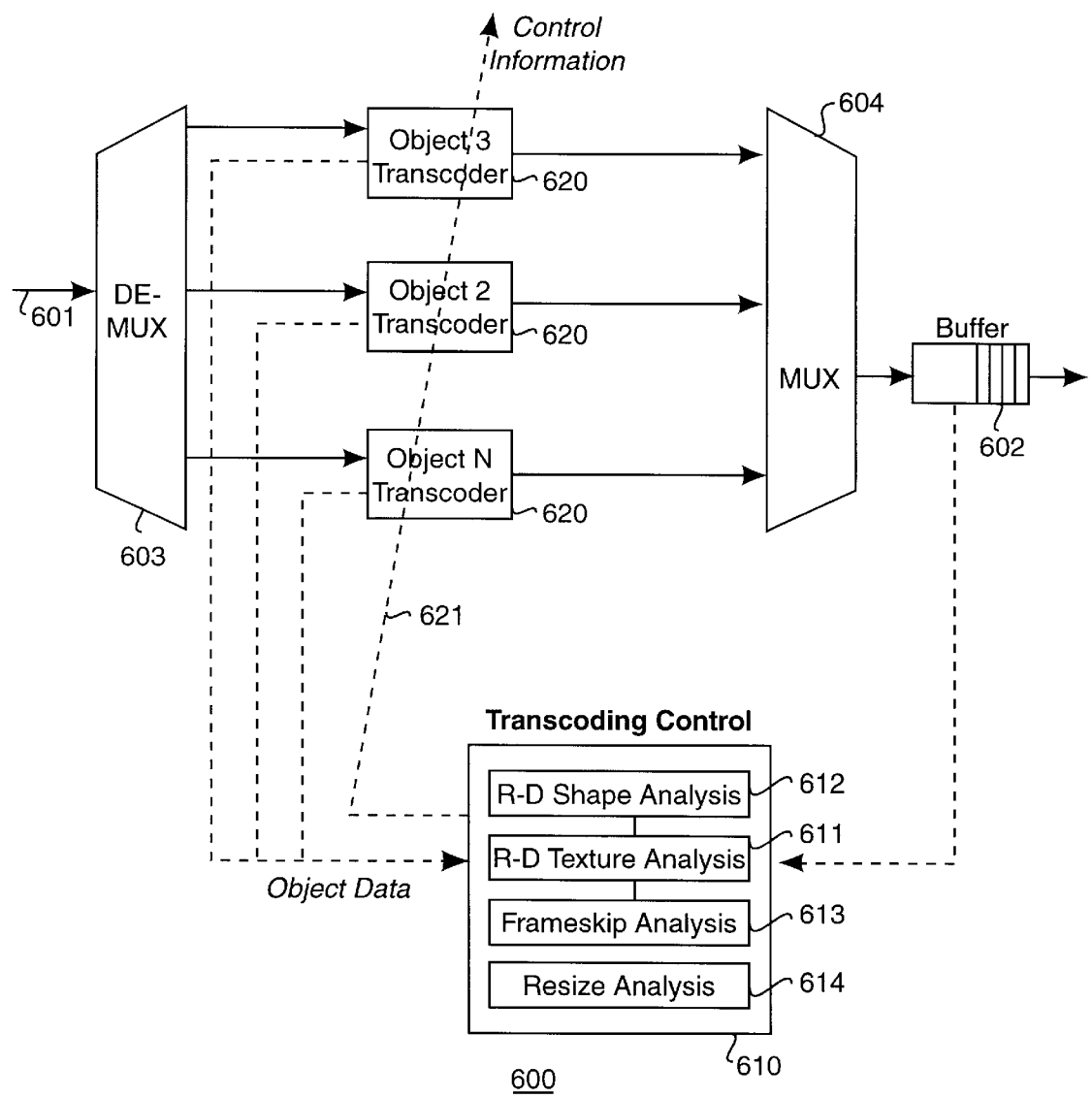
FIG. 6 is a block diagram of a transcoder according to the invention.

In contrast to the encoding application, an object-based transcoder 600, as shown in FIG. 6, receives objects that have already been encoded. However, due to bandwidth constraints that may be encountered within the network, the rate of the video scene must be decreased.

Over the years, a great deal of effort has been placed on architectures, methods of encoding and signal processing techniques that enable devices to transmit content robustly and alter the quality of the content to meet network demands.

Here, we describe methods for delivering object-based video data. More specifically, we exploit the fact that a finer level of scalability can be achieved when the video frame has been decomposed into objects. Until now, most prior art has focused on the delivery of frame-based video, which has been encoded using such standards as MPEG-1/2 and H.263. We build on this work by proposing a framework that considers an adaptive means of transcoding each of the objects in the scene based on available bandwidth and complexity of each object.

Our scheme is adaptive in that various techniques can be employed to reduce the rate depending on the ratio of incoming to outgoing rate, and since the goal is to provide the best overall quality for objects of varying complexity, the degradation of each object need not the same. In addition to considering traditional methods for reducing the rate, such as cutting the high frequency coefficients, dropping frames or resizing pictures, we also consider methods to reduce the number of bits used to describe the shape of an object. This is accomplished with the models that characterize the rate-distortion characteristics of the binary shape data as described above.

FIG. 6 shows a high-level block diagram of an object-based transcoder according to our invention. The input to the transcoder 600 includes object-based bitstreams 601 connected to a demultiplexer 603. The bitstreams have a total rate, $R_{in}$. The output 602 of the encoder 600 is another bitstream coupled to multiplexer 604. However, the rate of the output bitstream is less than the input rate, i.e., $R_{out} < R_{in}$.

We do not give the detailed architecture of the transcoders 620, these are well known in the prior art. We describe how one might accomplish this task taking into account the reduction of shape information. The transcoders are controlled by information 621.

To reduce the shape information, a shape model is needed to provide some analysis regarding the impact of the reduction in a rate-distortion sense. Because there are many ways to reduce the rate, a transcoding control 610 is responsible for choosing the best option or combination of options to achieve its goal.

As a result, some hierarchy is introduced to assist the controller 610 in making its decisions. In other words, the reduction 611 of texture information may be the transcoders first option. However, this is limited as increasing the quantization value can reduce percentage of incoming rate only by so much.

Based on the amount of decrease that is needed, the transcoder control may consider reducing 612 the shape bits in conjunction with texture to achieve its goal. If this is still not enough, the transcoder can resort to more drastic means of data reduction and consider dropping 613 frames or resizing 614 the picture. The hierarchy of control and the various combinations that can be efficiently employed are numerable. The point here is that shape reduction according to the invention be included as an option.

Another point worth noting is that the objects themselves need not be transcoded with equal quality. For example, the texture data of one object may be reduced, keeping intact its shape information, while the shape information of another object be reduced, keeping its texture information intact. Many other combinations can also be considered, including drooping frames. In a news clip, for example, it would be possible to reduce the frame rate along with the. texture and shape bits for the background, while keeping the information associated with the news reader intact.

Rate-Distortion Optimal Segmentation

It is likely that the results of a segmentation algorithm are not optimal for coding. The goal of the segmentation is to determine the boundary of an object. Since this is a subjective goal, it can be beneficial to the coding process when the blocks of the shape data are optimal in the rate-distortion sense. By this, we mean that the blocks will not incur much distortion when down-sampled so that a low rate can be achieved. The key point to keep in mind is that such an algorithm should maintain the integrity of the object segmentation that was produced.

Figure 7:
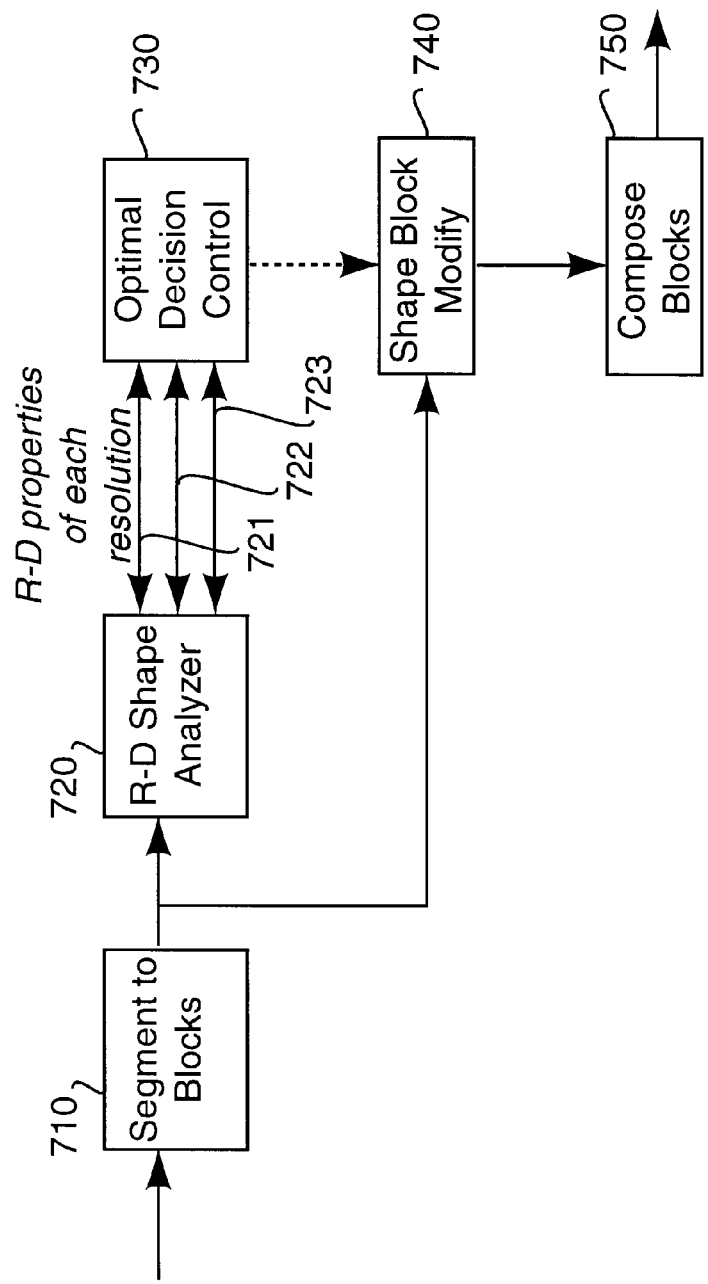
FIG. 7 is a block diagram of an object segmentor according.

FIG. 7 shows an object segmentor 700 according to the invention. The segmentor includes means 710 for partitioning frames into macroblocks, a shape analyzer 720 as described above, a decision control 730, a shape modifier 740, and a block composer 750.

The analyzer 720 determines a shape model for macroblock data. The results of the analysis, R-D properties 721–723 are then sent to the optimal decision controller 730. The purpose of this component is to use the R-D properties of the analysis to decide how the current block is to be modified. To keep with our goal of maintaining the integrity of the segmentation, some constraints can be imposed within this block so that the maximum number of pixels to be changed is bounded. The decision controller 730 is signals for the appropriate modifications 740 to the block. This process can yield an optimal R-D segmentation, given the maximum number of pixels that are allowed to change.

Figure 8A:
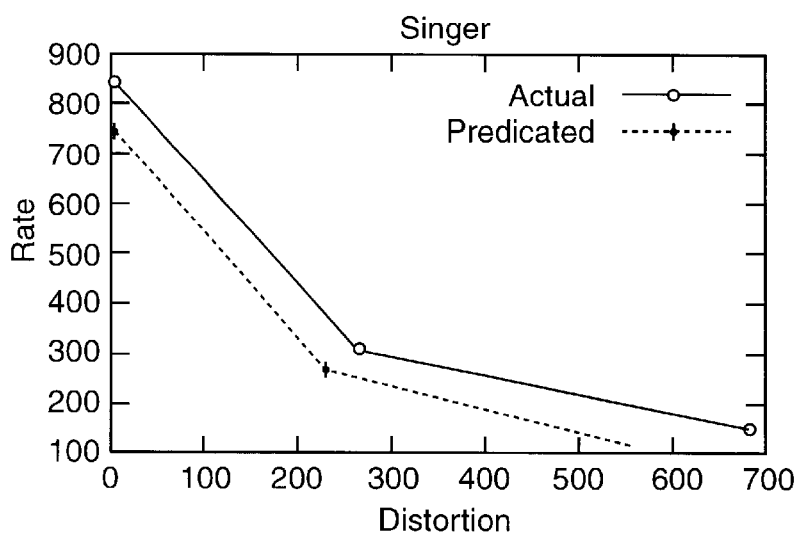
FIGS. 8a–8c are graphs of rate distortion ratios according to the invention.
Figure 8B:
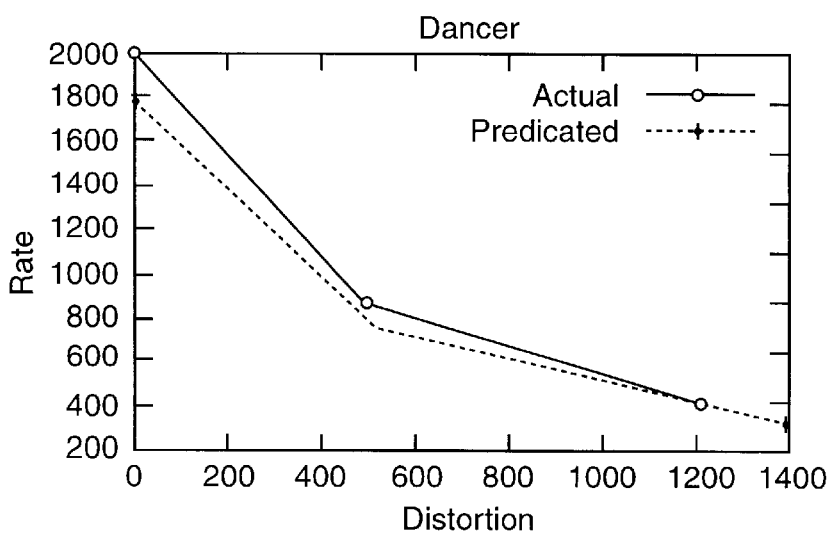
Figure 8C:
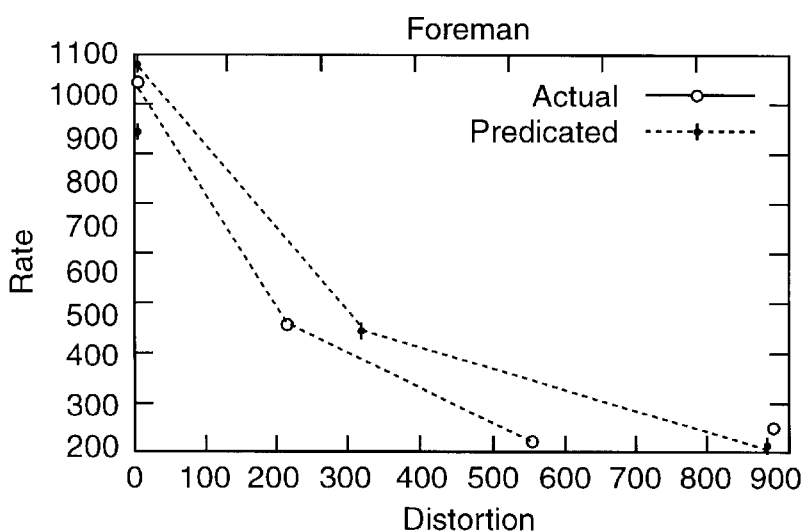

The operation of the decision controller 730 is not fixed. We only require that it accept the input of the R-D shape analysis. It may also need the actual shape data itself. In any case, decisions can be made based on the trace of the rate-distortion curve for each block. Optimal changes can be made to pixels on the boundary of the object in an attempt to improve the rate-distortion curve. This implies some interaction between the decision controller 730 and the R-D shape analyzer 720 before the final decision is made. When enough possibilities have been exhausted, the final block is output from the shape modify procedure. Finally, all the blocks are recomposed. FIGS. 8a–8c show the accuracy of our model for several standard MPEG-4 video sequences singer, dancer, and foreman. For each sequence the level of resolution is fixed for every block. In this way, all the blocks are coded at either full, half, or quarter- resolution. This produces three operating points in the R-D domain. As expected, the rate-distortion is predicted well, with rate giving a slightly better result. The reason for this occurrence is due to the fact that rate is accurately modeled from the fixed 2×2 neighborhood that we considered. This accuracy is partly accountable by the fact that the six state partitioning meets the predefined criteria. By doing so, the 10-bit states used by CAE can be correctly collapsed into one of the six available states. The distortion, on the other hand, is modeled less well because the actual up-sampling process uses a 12 pixel neighborhood and estimating distortion based on the 2×2 pixels is not sufficient. One way to overcome this problem may be to consider a larger neighborhood, e.g., 3×3. This increase would account for neighboring dependence, however one would then need to partition the possible configurations so that the predefined criteria are met.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for estimating rate and distortion characteristics of a video object, comprising the steps of:

extracting, respectively, first and second object shape features at a first and second resolution of the video object;

determining, respectively and according to first and second modeling parameters, first and second rate distortion characteristics of the video object from the extracted first and second object shape features.

2. The method of claim 1 wherein the extracted object shape features are discrete.

3. The method of claim 2 wherein the discrete object shape features are respectively represented by a first and second set of states of binary shape patterns of the video object.

4. The method of claim 1 wherein the extracted object shape features are continuous.

5. The method of claim 4 wherein the continuous object shape features are respectively represented by a first and second set of statistical moments of a probability density function of the video object.

6. The method of claim 1 further comprising the steps of:
   segmenting the video object into a plurality of macroblocks; and
   performing the extracting and determining steps for each of the plurality of macroblocks.

7. The method of claim 1 wherein the second resolution is a downsampling of the first resolution.

8. The method of claim 1 wherein the first resolution is a full resolution and the second resolution is a half resolution.

9. The method of claim 1 wherein the extracting is done for a plurality of resolutions.

10. The method of claim 1 wherein the second object shape features are predicted from the first object shape features.

11. The method of claim 1 wherein the first and second modeling parameters are acquired from a set of training video objects.

12. The method of claim 2 further comprising the steps of:
    partitioning the video object into a plurality of subblocks;
    classifying binary shape patterns of the plurality of subblocks into a set of states.

13. The method of claim 12 wherein each subblock has M×M pixels, and the number of binary patterns is $2^{(M \times M)}$, and the number of states is N, where N is substantially less than $2^{(M \times M)}$.

14. The method of claim 13 wherein each subblock includes a current pixel and (M×M)−1 neighborhood pixels.

15. The method of claim 12 wherein a parameter $q_{ij}$ represents a particular state i at a resolution j, where 0 is the first resolution and 1 the second resolution, and a parameter $n_i$ represents the number of occurrences of the particular state $q_{ij}$, $$D_j = \underline{\beta}_j^T \underline{n} = \sum_{i=0}^{N-1} \beta_{ij} n_{ij}$$

and wherein a rate R and a distortion D are determined by:

$$R_j = \underline{\alpha}_j^T \underline{n} = \sum_{i=0}^{N-1} \alpha_{ij} n_{ij}$$

where $\alpha_{ij}$ denotes a rate for coding a particular pattern which belongs to state $q_{ij}$, and $\beta_{ij}$ denotes a distortion that is associated with the particular pattern at scale j.

16. The method of claim 15 wherein the first resolution is full-scale and $\underline{\beta} = \underline{0}$.

17. The method of claim 15 wherein $\alpha_{ij} = -\log_2(p_{ij})$ where $p_{ij}$ is the probability of the particular state $q_{ij}$.

18. The method of claim 13 wherein each subblocks has 2×2, and there are sixteen binary patterns, and there are six states.

19. The method of claim 5 wherein the probability density function is a Markov random field.

20. The method of claim 19 further comprising the steps of:
    partitioning the video object in to a plurality of subblocks; and each subblock is characterized by edge, line, and noise parameters of the Markov random field.

21. The method of claim 20 wherein the Markov random field is of the form:

$$P_{e,l,n}(X) = \frac{1}{Z(e, l, n)} \exp[-e N_0(X) - l N_1(X) - n N_2(X)]$$

where, $$N_0(X) = \sum_{i=1,\ldots,51} \varepsilon(i)\zeta_i(X)$$

$$N_1(X) = \sum_{i=1,\ldots,51} \lambda(i)\zeta_i(X)$$

$$N_2(X) = \sum_{i=1,\ldots,51} \eta(i)\zeta_i(X)$$

and $\zeta_i(X)$ is the number of configurations of type i in the realization of X, and e, l, and n are the edge, line, and noise parameters respectively, and $N_e(X)$ is and $N_e(X)$ is the set of statistical moments.

22. The method of claim 1 further comprising the steps of:
    encoding motion of the video object;
    encoding texture of the video object;
    encoding shape of the video object according to the rate and distortion characteristics to enable an object-based video encoder.

23. The method of claim 22 wherein the object-based video encoder affects a quantizer value for texture encoding of the video object according to the rate and distortion characteristics.

24. The method of claim 22 wherein the object-based video encoder affects a conversion ratio for video object encoding according to the rate and distortion characteristics.

25. The method of claim 22 wherein the object-based video encoder affects an encoding rate for video object encoding according to the rate and distortion characteristics.

26. The method of claim 1 further comprising the steps of:
    demultiplexing a received video signal including a plurality of video objects encoded at a first bit rate;
    transcoding the plurality of video objects according to the rate distortion characteristics of the video objects; and
    multiplexing the transcoded video objects at a second bit rate to enable an object-based video transcoder.

27. The method of claim 24 wherein the first bit rate is greater than the second bit rate.

28. The method of claim 6 further comprising the steps of:
    modifying the plurality of macroblocks according to the rate distortion characteristics; and
    recomposing the modified macroblocks to enable optimal video object segmentation.

* * * * *